US005894326A

United States Patent [19]
McIntyre et al.

[11] Patent Number: 5,894,326
[45] Date of Patent: Apr. 13, 1999

[54] ELECTRONIC CAMERA HAVING A PRINTER

[75] Inventors: Dale F. McIntyre, Honeoye Falls; Stanley W. Stephenson, III. Spencerport; Mark M. Meyers. Hamlin; John K. McBride, Rochester, all of N.Y.

[73] Assignee: Eastman Kodak Company, Rochester, N.Y.

[21] Appl. No.: 08/703,289

[22] Filed: Aug. 26, 1996

[51] Int. Cl.[6] .......................... H04N 5/222; H04N 5/225
[52] U.S. Cl. .......................... 348/333; 348/376; 348/375
[58] Field of Search .................. 348/231, 357, 348/350, 346, 239, 333, 334, 375, 376, 207; 361/681; 345/901, 903, 905; 379/433; 455/550, 566; 396/374, 287, 429; H04N 5/222, 5/225

[56] References Cited

U.S. PATENT DOCUMENTS

| | | | |
|---|---|---|---|
| 4,161,749 | 7/1979 | Erlichman | 358/75 |
| 4,262,301 | 4/1981 | Erlichman | 358/6 |
| 4,768,050 | 8/1988 | Beery | 354/304 |
| 4,827,347 | 5/1989 | Bell | 358/224 |
| 4,937,676 | 6/1990 | Finelli et al. | 358/229 |
| 5,049,902 | 9/1991 | Duke | 346/110 |
| 5,122,432 | 6/1992 | Hammann, IV et al. | 430/138 |
| 5,218,455 | 6/1993 | Kristy | 358/403 |
| 5,313,611 | 5/1994 | Franklin et al. | 395/425 |
| 5,379,159 | 1/1995 | Lemelson | 360/35.1 |
| 5,432,906 | 7/1995 | Newman et al. | 395/162 |
| 5,446,599 | 8/1995 | Lemelson | 360/35.1 |
| 5,462,375 | 10/1995 | Isobe et al. | 400/680 |
| 5,493,409 | 2/1996 | Maeda et al. | 358/296 |

*Primary Examiner*—Wendy Garber
*Assistant Examiner*—Jacqueline Wilson
*Attorney, Agent, or Firm*—Raymond L. Owens

[57] ABSTRACT

In an electronic camera including optics for focusing an image of a subject at an image plane; an area image sensor disposed at the image plane for receiving the image subject and producing a digital image representing the subject; storage memory coupled to the area image sensor for storing the digitized image of the subject; and a moveable display being moveable between a user viewable position to a print position and adapted to be selectively coupled to the storage means for displaying an image of the subject. The camera further includes an optical printer being adapted to be optically coupled to the display when in its print position for producing a hard copy output of the subject represented by the display; and logic and control circuitry being responsive to the display moving to its print position for deenergizing the display after an image to be printed is selected and for reenergizing the display means when in its print position.

3 Claims, 6 Drawing Sheets

ELECTRONIC CAMERA HAVING A PRINTER

CROSS-REFERENCE TO RELATED APPLICATION

Reference is made to commonly assigned and concurrently filed U.S. Ser. No. entitled "Electronic Camera Having a Printer for Providing Improved Hard Copy Images" by Dale F. McIntyre.

FIELD OF THE INVENTION

The present invention relates to electronic cameras and, more particularly, to an electronic camera which produces a visual display and a hard copy of such visual display.

BACKGROUND OF THE INVENTION

It is known in the prior art to provide an electronic camera which uses an area image sensor. Digital images produced from the image sensor are stored in memory and these images can be shown on a display so that the user can determine which image should be stored for use in producing hard copy images. Typically, these images can be stored in a magnetic disk or a compact PCMCIA Flash RAM Card.

In U.S. Pat. No. 4,262,301 an electronic camera is disclosed which includes a display device. The camera also includes a digital-to-analog converter which sends signals to the display. Also, the digital-to-analog converter selectively sends these images to a magnetic tape for storage. Images on the magnetic tape can then be produced as a hard copy by a printer which is provided on the camera. A problem with the approach in U.S. Pat. No. 4,262,301 is approach is that a print must be made in order for a user to determine whether it is satisfactory.

A shortcoming with prior electronic cameras is that the printer is spaced from the camera and must be electrically coupled to digital storage structure within the camera which frequently produces artifacts. Printers often use a structure which provide relative movement of a head and a media sheet which induces artifacts into the output hard copy print and is therefore difficult to provide an effective structure mounted on a camera body.

SUMMARY OF THE INVENTION

It is an object of the present invention to provide an electronic camera with a printer which can effectively provide a hard copy and minimize the above problems.

This object is achieved by an electronic camera, the improvement comprising:

a) means for focusing an image of a subject at an image plane;

b) area image sensor means disposed at the image plane for receiving the image subject and producing a digital image representing the subject;

c) storage means coupled to the area image sensor for storing the digitized image of the subject;

d) moveable display means being moveable between a user viewable position to a print position and adapted to be selectively coupled to the storage means for displaying an image of the subject;

e) optical printer being adapted to be optically coupled to the display means when in its print position for producing a hard copy output of the subject represented by the display means; and f) logic and control means being responsive to the display means moving to its print position for deenergizing the display means after an image to be printed is selected and for reenergizing the display means when in its print position.

Advantages

It is an advantage of the present invention that by making hard copies directly optically from the display which can be moveable from a print position in the camera body from a user viewable position. Fast, inexpensive coupling is generated between the camera and media. Hard copies can be made free from artifacts and without noise caused by either electronic systems or by printer systems which moves media past a print head.

DETAILED DESCRIPTION OF THE INVENTION

Figure 1:
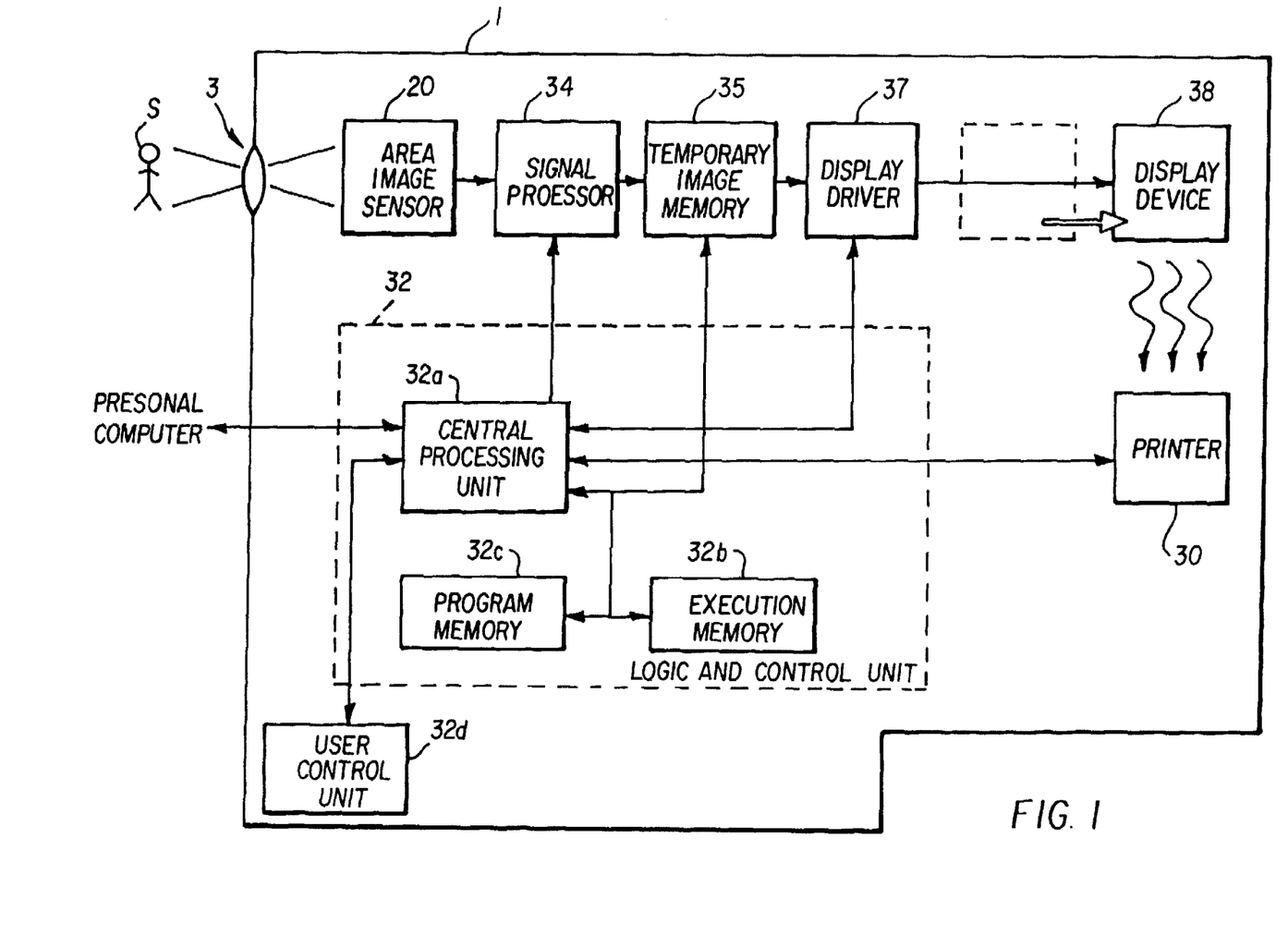
FIG. 1 is a block diagram of a digital camera in accordance with the present invention with the necessary electronics for operating the camera.

In FIG. 1, a block diagram is shown of various systems within the camera 1. As shown, a subject S is positioned in front of the imaging lens 3. The camera includes an area image sensor 20 arranged to coincide with the axis of the imaging lens 3. A printer 30 will be discussed later. An image of the subject is focused on the area image sensor 20. Area image sensor 20 can be a full frame charge coupled device (CCD) or, alternatively, can be an interline device with, for example, photodiode pixels which are adapted to deliver charge to interline CCDs. Conventional electronic circuitry (not shown) is associated with the image sensor 20. After the image sensor 20 receives light representative of the image of the subject S, the circuitry sets up, acquires, and transfers electronic signals from the area image sensor 20. Such electronics are well known in the art and their description is omitted for clarity of discussion.

Logic and control unit 32 causes the area image sensor 20 to transfer electrical signal processor 34. The signal processor will be understood to include that circuitry necessary for converting the area image sensor signals to electrical signals and includes gain control and analog-to-digital circuitry as well known in the art. The logic and control unit 32 can, of course, include a microprocessor as is well known to those skilled in the art. The signal processor 34 delivers, under the control of logic and control unit 32, signals into a storage location in a temporary image memory 35 which can be either a floppy disk or semiconductor memory under the control of logic and control unit 32. These signals, when stored, represent a digital image of the subject. The logic and control unit 32 causes the digital signals in memory to be applied to a display driver 37 which, in turn, applies signals to a display device 38. The display driver 37 will be understood to include a digital-to-analog converter and formatting control which is appropriate for the type of display device as well known in the art. The display device 38 may be embodied as a liquid crystal display. As well understood to those skilled in the art, the logical and control unit 32 provides refresh signals to the display device 38. In accordance with the present invention, when a hard copy is desired, a user signals to logic and control unit 32 to move the display device 38 from a viewing position (shown in dotted lines) to a printing position (shown in solid lines) and to activate the printer as will now be described. It will be understood that the logic and control unit 32 can also deliver the digital image to an external device such as a personal computer.

The logic and control unit 32 is shown to include a central processing unit 32a which may be provided by a microprocessor chip. Execution memory 32b is also shown and is typically provided by random access memory (RAM). This memory is used for computation during image adjustment of the various parameters. As is well known to those in this art, the program memory 32c (typically ROM) can include conventional programs for image rotation, contrast and brightness adjustment, and also changing the color content by socalled color management programs. A user control unit 32d, including a keyboard, permits a user to select the appropriate program by directly inputting interrupt signals into the central processing unit 32a.

Many of such image processing algorithms have been implemented as commercially available packages (which perform all functions on the highest resolution data. See, for example, U.S. Pat. No. 5,218,455, the disclosure of which is incorporated herein by reference. These encoding schemes are optimized for performance and are commercially available as libraries of subroutines, such as MathPAK 87 (a trademark of Precision Plus Software). Additional image processing algorithms that may be used are included in the following commercially available packages: Photoshop (trademark of Adobe Systems Incorporated), Color Studio (trademark of Letraset), and PhotoMac (trademark of Avalon Development Group). For examples of color management systems including color transforms for changing color content such as contrast, brightness, and gamut, see U.S. Pat. Nos. 5,313,611 and 5,432,906, the disclosures of which are incorporated herein by reference.

Figure 2:
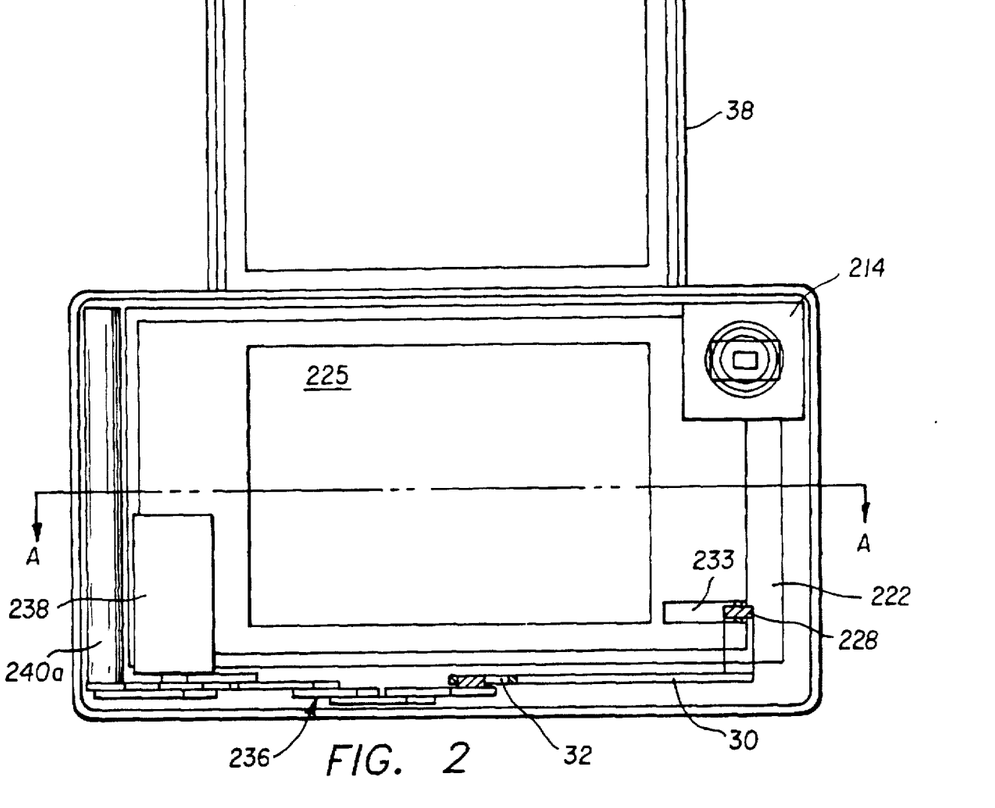
FIG. 2 is a back view of a digital camera showing its image display in a user viewable position and having an optical printer.
Figure 3:
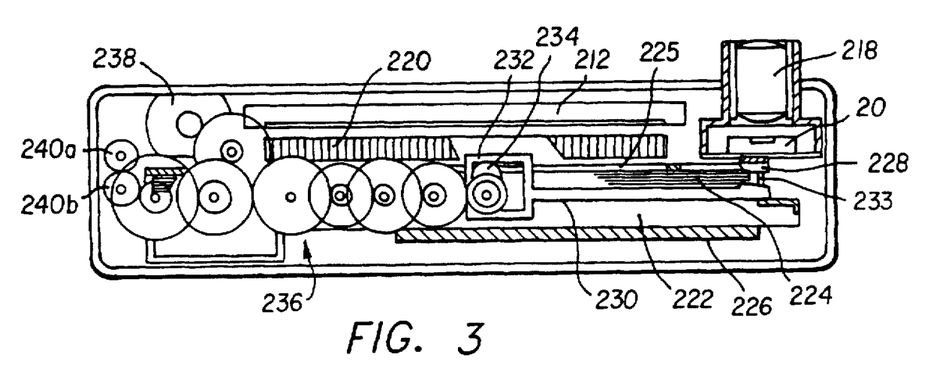
FIG. 3 is a bottom view of the camera shown in FIG. 2.
Figure 4:
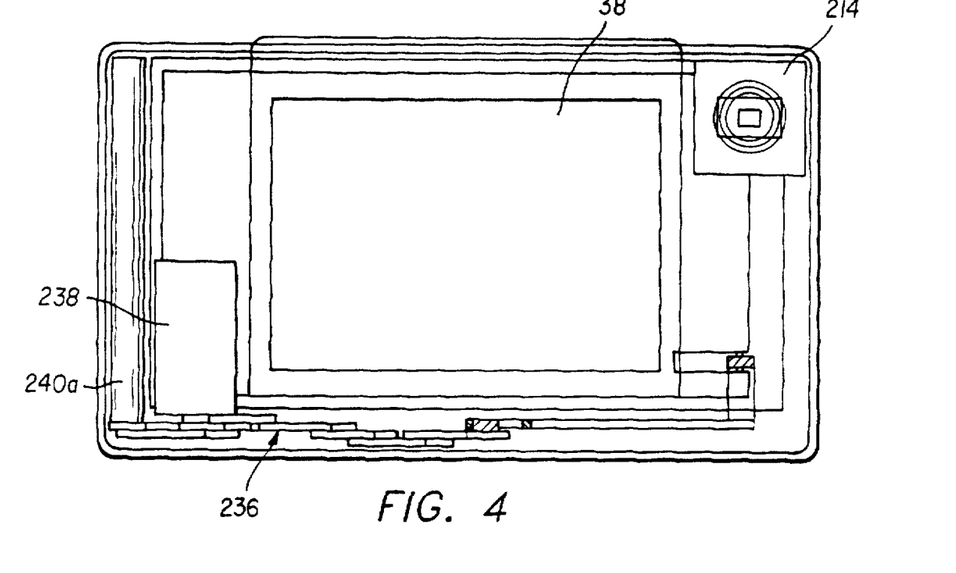
FIG. 4 is a back view of the digital camera of FIG. 2 showing its image display in a storage position ready for printing.

Turning now to FIG. 2, the digital camera is shown in a back view. Camera body 1 houses image capture assembly 214. Image capture assembly 214 contains the area image sensor 20 and capture optics 218 (see FIG. 3). Capture optics 218 is adjusted to focus an image onto area image sensor 20. Area image sensor 20 operates to capture an image, which is stored in temporary image memory 35 (see FIG. 1). Captured images are displayed on display device 38, which can be a liquid crystal display of conventional design. Display device 38 is movable from a first viewable position as shown in FIG. 2 to a store/printing position within camera body 1 as shown in FIG. 4. Display device 38 is positioned substantially at the front of the camera body 1 and faces backwards towards a user.

The printer 30 will now be described. Although the printer 30 will be described as a device which is in a fixed position, it will be appreciated that the printer can also be moveable from a storage to a print position and that the display device 38 can also be maintained in a fixed position. In FIG. 3, when display device 38 is moved to the stored position, the image display faces a media cassette 222. Media cassette 222 contains light sensitive media 224. Also, a flat lithium battery 226 is used to provide the power source for both the printer 30 and the camera. The interior of camera body 1 is light tight and permits exposure of the media only upon selective activation of display device 38. To this end, light seals, not shown, are placed around the opening in camera body 1 which receives display device 38. Media cassette 222 is also light tight and has a cassette opening 225, which corresponds to the image capture area of the media. A light-opaque sheet is the first unit of the stack of media 224 and seals the cassette opening 225 before loading. After media cassette 222 is inserted into the camera body 1, the cover sheet is ejected and the printer 30 is ready to print. Media 224 can be provided by conventional instant camera film such as Polaroid Captiva 95 film. Alternatively, media 224 can be coated with microencapsulated crushable color particles such as disclosed in U.S. Pat. Nos. 4,768,050; 5,049,902; and 5,122,432.

Figure 11:
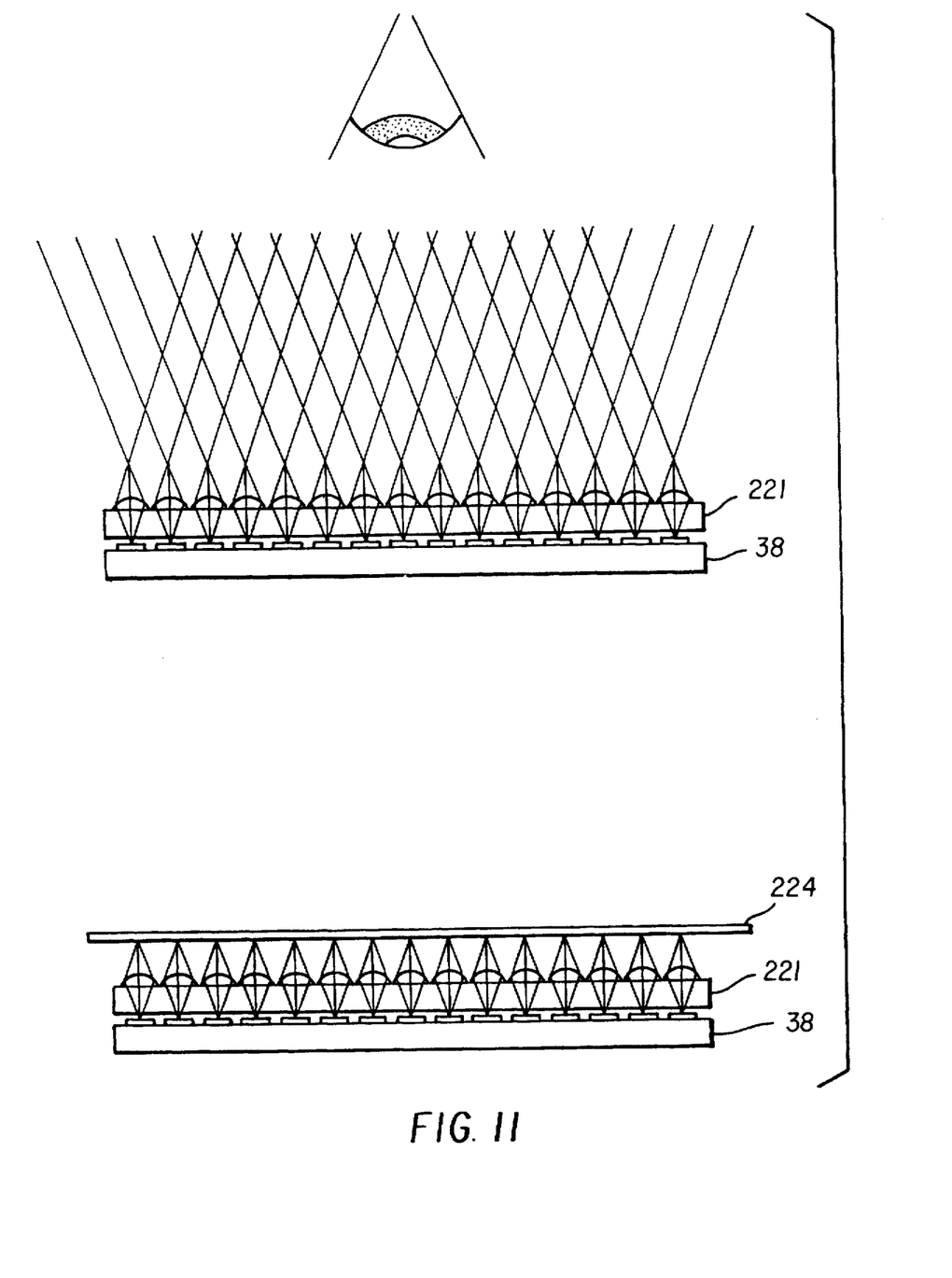
FIG. 11 is a side view of an optical system used in digital cameras in accordance with this invention.

Relay optics 221 are disposed between the display device 38 and photosensitive media cassette 222. The relay optics 221 can be formed as an array of micro-optics with a center to center spacing which corresponds to the display element center to center distance (see FIG. 11). In this case the lenslets in the micro-optic array form inverted images of the display pixels, but since they image only one pixel at a time, the inversion has no net negative effect. The lenslets can be formed on the coverglass. If formed on the coverglass, the display can still be used. Alternately, a 1:1 imaging lens array with lenslet center to center distances much greater than the pixel center to center distance, such as the Ricoh Roof Mirror Lens Array, can be used. In addition, two (or three) arrays can be used to form an inverted image and form a second inverted image of the first image (with an optional array of field lenses if three arrays are used). These multi-array systems can have larger center to center distances than the pixel spacing. In another embodiment, and array of gradient index lenses such as a selfoc lens array from Nippon Sheet Glass can be used. A further embodiment would utilize an array of optical fibers whose diameters are adjusted to be the same as the display pixel center to center spacing to contact print onto a photosensitive media.

Exposure of media 224 is done using display device 38. As display device 38 enters camera body 1, display device 38 is turned off by a sensor being actuated which sends a signal to the central processing unit 32a shown in FIG. 1. When display device 38 is positioned with respect to cassette opening 225, display device 38 is turned on so as to expose media 225. When the user determines that an image is to be printed, the central processing unit 32a retrieves the image from the temporary storage and creates a mirrored image of the previously displayed image and reapplies that to the display device for printing. It will be understood that the program memory 32c includes the necessary program for providing this function. This type of program is well known in the printing art. The display device 38 can be adjusted as well known to those skilled in the art to create an image of correct density and color balance on the media 224.

Upon completion of the exposure of media 224, media 224 is urged into a set of processing rollers 240a and 240b. Motor 238 drives gear train 236 to drive processing rollers 240a and 240b and also to turn a picker cam 234. Timing of the process is done based on the position of picker cam 234. Sensors, not shown, are used to control the operation of motor 238 so as to end each drive cycle in a home position as shown in FIG. 3, a bottom view of the apparatus.

Figure 5:
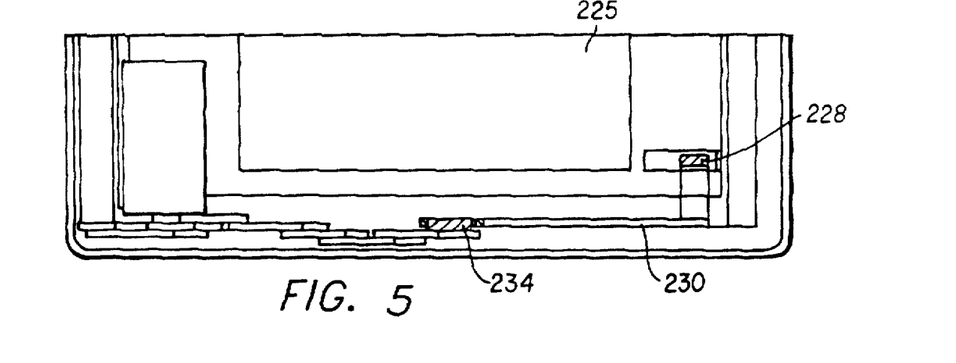
FIG. 5 is a side sectional view taken along the lines A—A of FIG. 2
Figure 6:
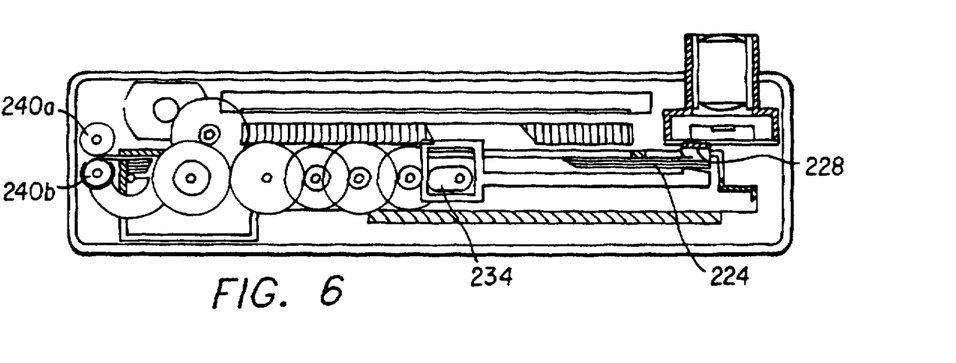
FIG. 6 is a bottom view similar to FIG. 2 but showing a photosensitive sheet in the process of being driven by a set of processing rollers.

The media 224 is pushed into rollers 240a and 240b by picker 228. Picker 228 operates on the stack of media 224 through picker opening 233 in media cassette 222. Picker 228 is attached through picker arm 230 to picker yoke 232. A compliance structure (not shown) continuously urges picker 228 and picker yoke 232 and picker 228 to the right towards the initial picking position. As picker cam 234 rotates counter clockwise, picker yoke 232 is driven to the left and through picker arm 230 causes picker 228 to push media 224 into processing rollers 240a and 240b. FIGS. 5 and 6 show picker 228 at full travel, with media 224 within the nip formed by processing rollers 240a and 240b.

If media 224 is a conventional instant camera film, processing rollers 240a and 240b burst a packet of processing chemistry. This chemistry is squeezed across the surface of media 224 as media 224 is driven out of camera body 1. A second chamber (not shown) at the distal end of media 224 receives excess chemistry.

Alternatively, media 224 can be coated with pressure processable chemistry such as microencapsulated crushable color particles. Micro particles or microbeads with dye forming chemistry are coated on the surface of media 224. These beads are responsive to light, so as to polymerize in the presence of actinic radiation. A plurality of polymerizing chemistries is used, responsive to various wavelengths so as to form color images use three dyes nominally forming red, green and blue dyes. Display device 38 provides matching sets of three types of radiation, polymerizing microbeads as a function of wavelength. Processing rollers 240a and 240b are used to selectively burst said microbeads based on the degree of radiation each bead has received. This selective bursting forms a stable color replicate of the image captured by image capture assembly 214.

Motor 238 continues to turn processing rollers 240a and 240b to fully eject media 224. Gear train 236 is designed so that operation of motor 238 will fully eject media 224 before picker cam 232 returns to the starting position. The sensing structure (not shown) senses when picker cam 234 is in the home position and deactivates motor 238.

Figure 7:
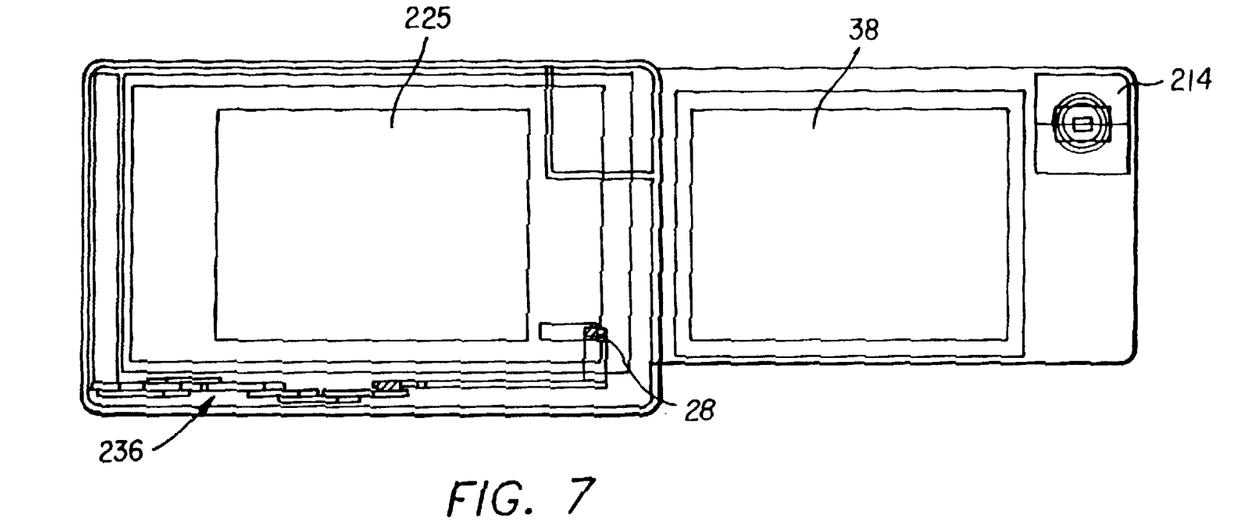
FIG. 7 is a back view of another digital camera in accordance with the present invention showing the display in the user viewable position.
Figure 8:
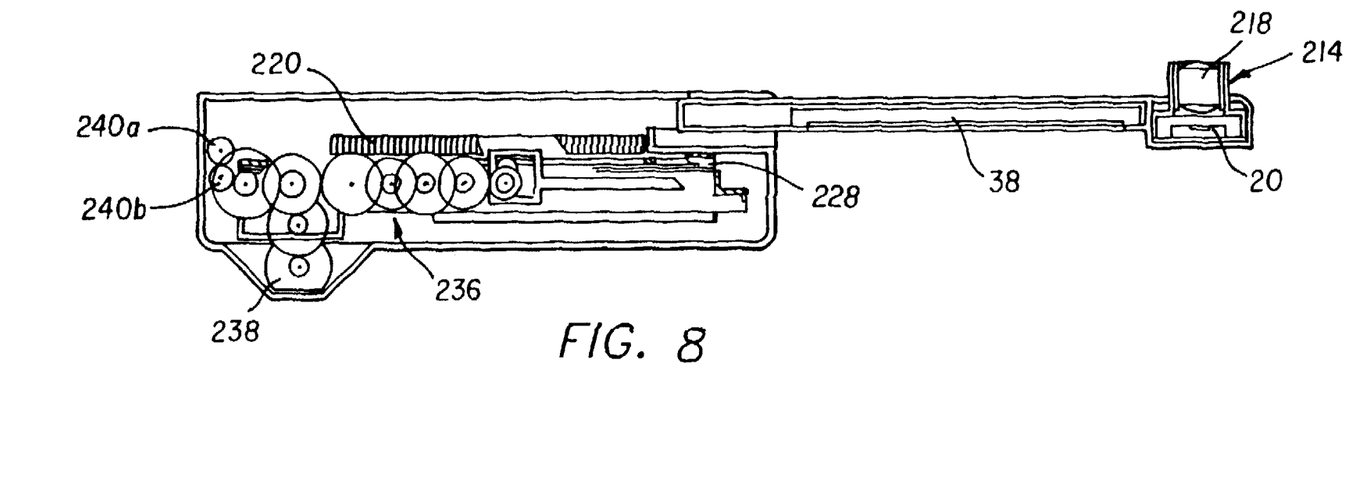
FIG. 8 is a bottom view of the camera shown in FIG. 7.

An alternative embodiment is shown in FIGS. 7 through 10. Where parts correspond to those in the first embodiment, the same numbers will be used. FIG. 7 is a back view which includes display device 38 and image capture assembly 214. These components are operable relative to camera body 1 to move laterally into a deployed position for electronic capture and display of images. Display device 38 and image capture assembly 214 are disposed to the front of the camera body 1. Display device 38 faces toward the back of the camera body 1 so as to be viewable by a user.

Figure 9:
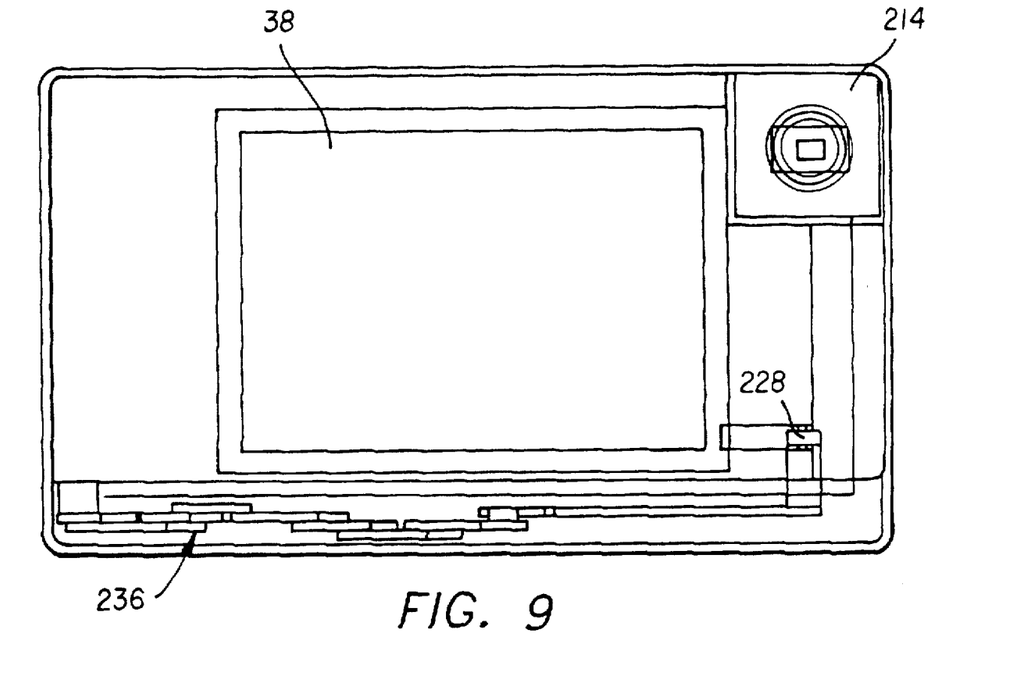
FIG. 9 is a back view similar to FIG. 7 but showing the display in its storage position.
Figure 10:
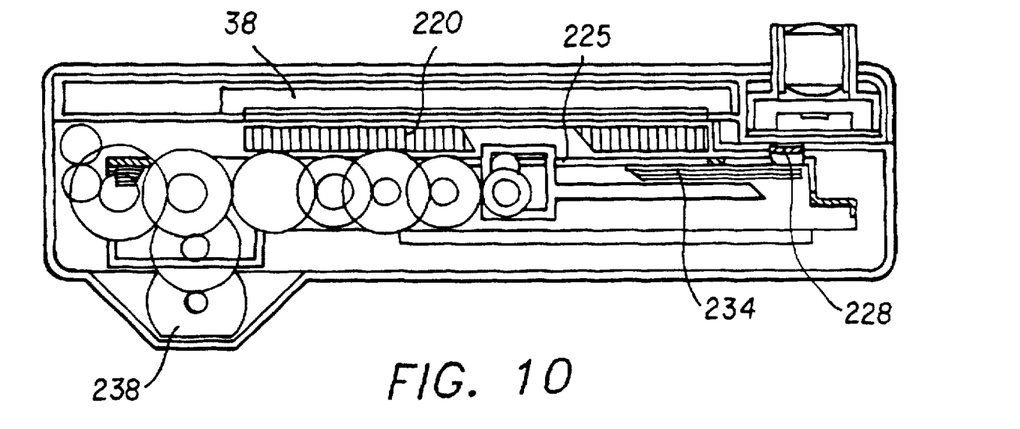
FIG. 10 is a bottom view of the camera shown in FIG. 7 with the display in its storage position.

FIG. 9 shows the second embodiment in a stored/printing position.

The assembly includes a display device 38 and image capture assembly 214 which slides into the camera body 1 in a light-tight fashion. Display device 38 has been brought into a position relative to cassette opening 225 and relay optics 221 so that an image on display device 38 projected onto media 224. Transfer and processing of media 224 occurs in the same manner as the first embodiment. Because of the additional extension of display device 38 and image capture assembly 214, motor 238 has been moved to the back of camera body 1. In addition picker 228 has been lowered slightly to be within the light tight walls formed in camera body 1.

The invention has been described in detail with particular reference to a certain preferred embodiment thereof, but it will be understood that variations and modifications can be effected within the spirit and scope of the invention.

Parts List
1 camera body
3 imaging lens
20 area image sensor
26 printed circuit board
30 printer
32 logic and control unit
32a central processing unit
32b execution memory
32c program memory
32d user control unit
34 signal processor
35 temporary image memory
37 display driver
38 display device
214 image capture assembly
218 capture optics
221 relay optics
222 media cassette
224 media
225 cassette opening
226 flat lithium battery
228 picker
230 picker arm
232 picker yoke
233 picker opening
234 picker cam
236 gear train
238 motor
240a processing rollers
240b processing rollers

We claim:

1. In an electronic camera, the improvement comprising:
   a) means for focusing an image of a subject at an image plane;
   b) area image sensor means disposed at the image plane for receiving the image subject and producing a digital image representing the subject;
   c) storage means coupled to the area image sensor for storing the digitized image of the subject;
   d) moveable display means being moveable between a user viewable position to a print position and adapted to be selectively coupled to the storage means for displaying an image of the subject; and
   e) optical printer being adapted to be optically coupled to the display means when in its print position for producing a hard copy output of the subject represented by the display means.

2. In an electronic camera having a camera body, the improvement comprising:
   a) means for focusing an image of a subject at an image plane in the camera body;
   b) area image sensor means disposed at the image plane for receiving the image subject and producing a digital image representing the subject;
   c) storage means coupled to the area image sensor for storing the digitized image of the subject;
   d) moveable display means being moveable between a user viewable position spaced from the camera body to a stored print position wherein it is in the camera body and adapted to be selectively coupled to the storage means for displaying an image of the subject;

e) optical printer means being adapted to be optically coupled to the display means when in its print position for producing a hard copy output of the subject represented by the display means; and f) logic and control means being responsive to the display means moving to its print position for deenergizing the display means after an image to be printed is selected and for reenergizing the display means when in its print position.

3. In an electronic camera having a camera body, the improvement comprising:

a) means for focusing an image of a subject at an image plane in the camera body;

b) area image sensor means disposed at the image plane for receiving the image subject and producing a digital image representing the subject;

c) storage means coupled to the area image sensor for storing the digitized image of the subject;

d) moveable display means being moveable between a user viewable position spaced from the camera body to a stored print position wherein it is in the camera body and adapted to be selectively coupled to the storage means for displaying an image of the subject; and e) optical printer means being adapted to be optically coupled to the display means when in its print position for producing a hard copy output of the subject represented by the display means; and f) logic and control means being responsive to the display means moving to its print position for deenergizing the display means after an image to be printed is selected and for reenergizing the display means when in its print position, such logic and control means being coupled to the storage means and including means for adjusting the digitized image of the subject and for applying such adjusted digitized image to the printer means when in its print position.

* * * * *